(12) United States Patent
Studebaker, Jr.

(10) Patent No.: US 11,000,010 B2
(45) Date of Patent: May 11, 2021

(54) BALE FEEDER APPARATUS, SYSTEM AND METHOD

(71) Applicant: Robert L. Studebaker, Jr., Tulsa, OK (US)

(72) Inventor: Robert L. Studebaker, Jr., Tulsa, OK (US)

( * ) Notice: Subject to any disclaimer, the term of this patent is extended or adjusted under 35 U.S.C. 154(b) by 457 days.

(21) Appl. No.: 15/495,368

(22) Filed: Apr. 24, 2017

(65) Prior Publication Data

US 2017/0303501 A1    Oct. 26, 2017

Related U.S. Application Data

(60) Provisional application No. 62/326,500, filed on Apr. 22, 2016, provisional application No. 62/365,324, filed on Jul. 21, 2016.

(51) Int. Cl.
    *A01K 5/01*      (2006.01)
    *A01K 5/015*     (2006.01)

(52) U.S. Cl.
    CPC ............. *A01K 5/01* (2013.01); *A01K 5/015* (2013.01)

(58) Field of Classification Search
    CPC ............. A01K 5/01; A01K 5/00; A01K 1/10
    See application file for complete search history.

(56) References Cited

U.S. PATENT DOCUMENTS

| | | | | |
|---|---|---|---|---|
| 418,006 | A * | 12/1889 | Gill | A01K 5/01 119/59 |
| 5,127,368 | A * | 7/1992 | Akins | A01K 1/10 119/60 |
| 6,951,189 | B1 * | 10/2005 | Lienemann | A01K 5/01 119/58 |
| 8,555,815 | B2 * | 10/2013 | Hofer | A01K 5/01 119/58 |
| 8,720,373 | B1 * | 5/2014 | Tesinsky | A01K 1/10 119/60 |
| 2005/0217593 | A1 * | 10/2005 | Rice | A01K 5/01 119/60 |
| 2006/0288945 | A1 * | 12/2006 | Jackson | A01K 5/0107 119/60 |
| 2010/0132617 | A1 * | 6/2010 | Lienemann | A01K 5/01 119/58 |
| 2010/0263597 | A1 * | 10/2010 | Kerns | A01K 1/10 119/60 |

* cited by examiner

*Primary Examiner* — Jessica B Wong
(74) *Attorney, Agent, or Firm* — Frederic Dorwart, Lawyers PLLC; Penina Michlin Chiu

(57) ABSTRACT

A bale feeder apparatus, system and method is described. A bale feeder for feeding a herd of livestock includes at least three ring-shaped horizontal rails including a top rail, a bottom rail and a middle rail, the middle rail spaced above the bottom rail at a middle rail height measured from a ground, and a plurality of neck rails extending upwards and inwards from the middle rail to the top rail, each neck rail spaced apart from an adjacent neck rail on same side of the bale feeder at a neck rail distance, the middle rail height about equal to a length of a longest foreleg expected in the herd of livestock, and the neck rail distance falling within a range bounded by a widest head expected in the herd of livestock, and a narrowest adult shoulder width expected of any adult animal in the herd of livestock.

12 Claims, 12 Drawing Sheets

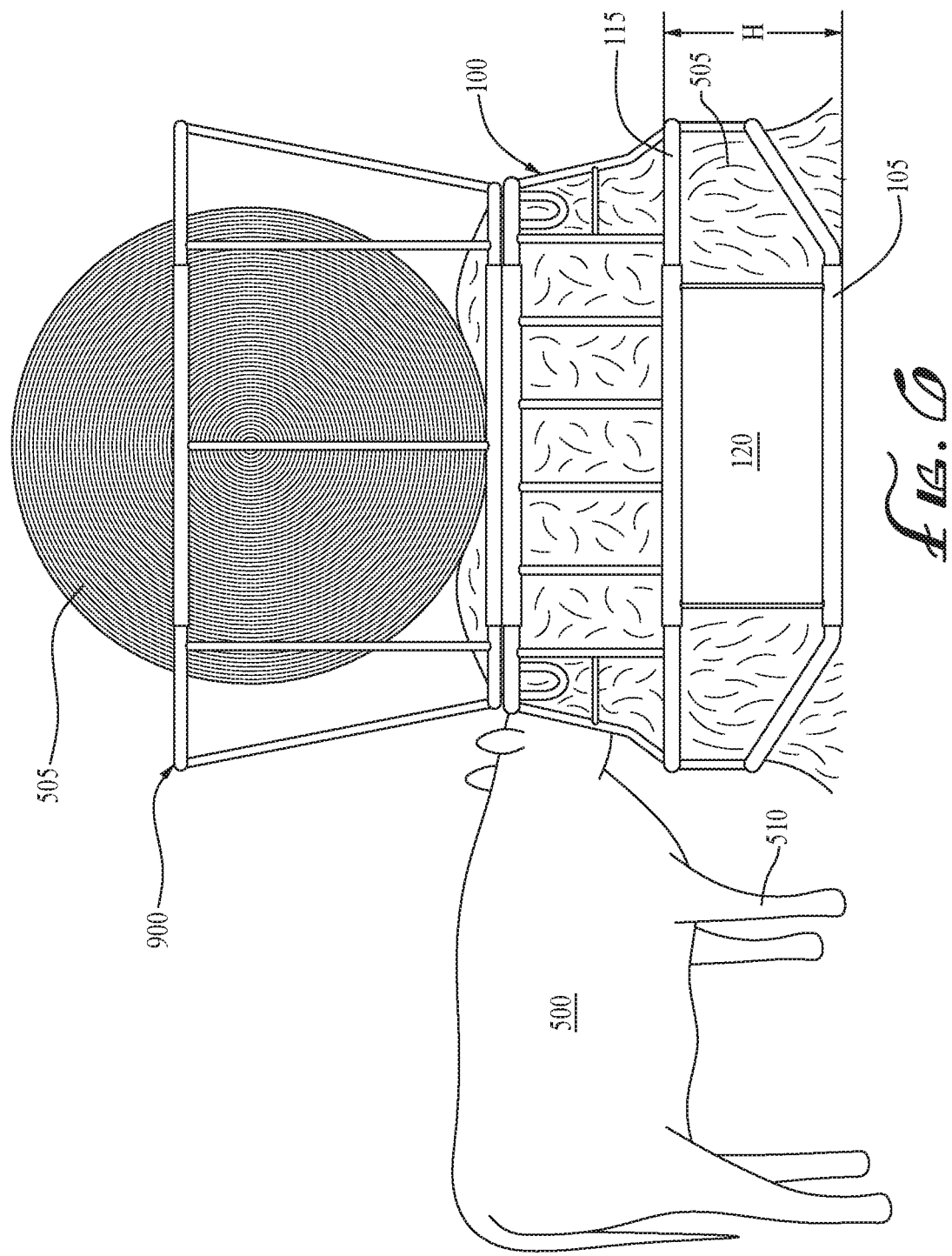

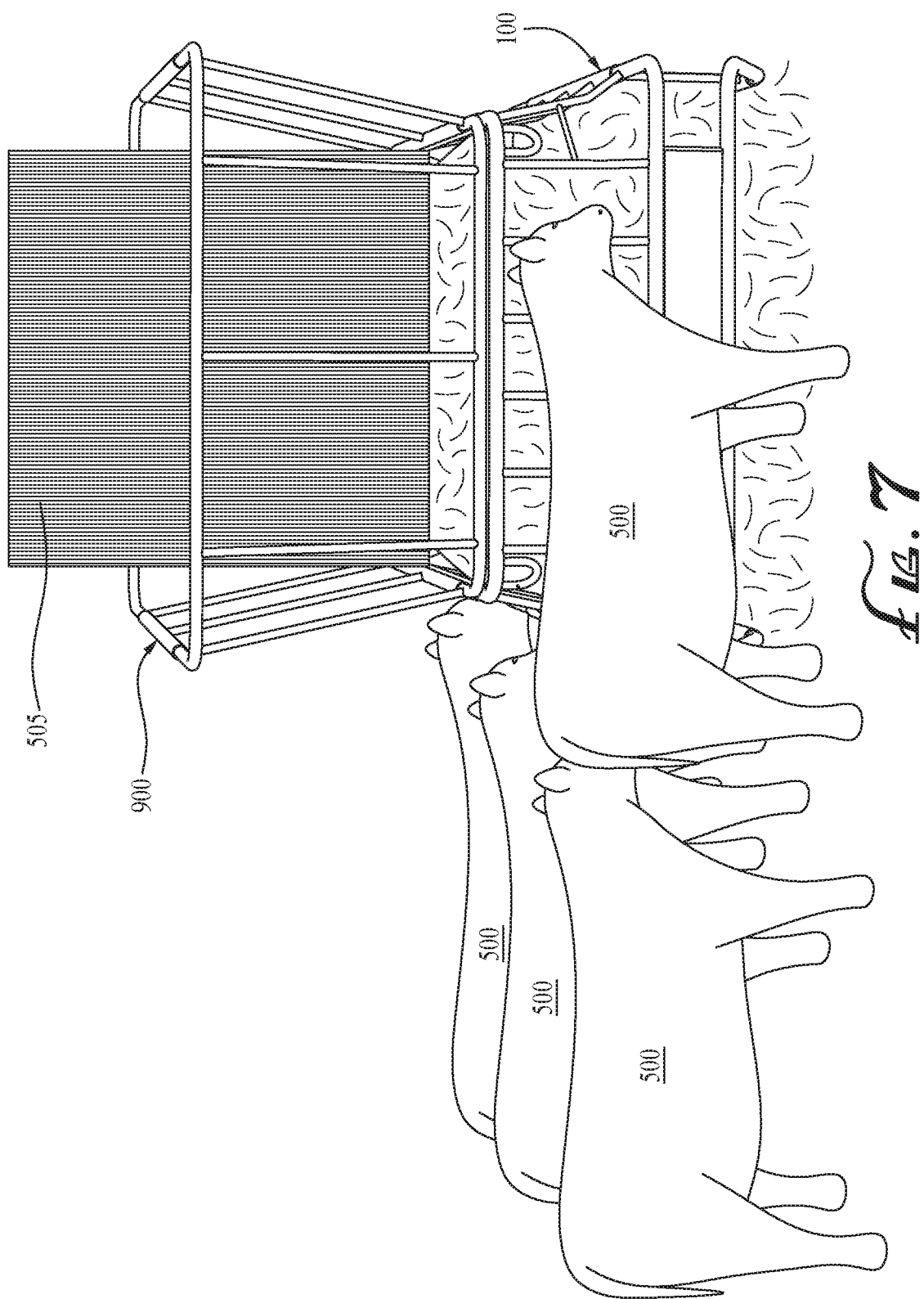

BALE FEEDER APPARATUS, SYSTEM AND METHOD

CROSS REFERENCE TO RELATED APPLICATIONS

This application claims the benefit of U.S. Provisional Application No. 62/326,500 to Studebaker, filed Apr. 22, 2016 and entitled "BALE FEEDER APPARATUS, SYSTEM AND METHOD," and also claims the benefit of U.S. Provisional Application No. 62/365,324 to Studebaker, filed Jul. 21, 2016 and entitled "HAY FEEDER RACK," each of which are hereby incorporated by reference in their entireties.

BACKGROUND OF THE INVENTION

1. Field of the Invention

Embodiments of the invention described herein pertain to the field of ranch equipment for feeding livestock. More particularly, but not by way of limitation, one or more embodiments of the invention enable a bale feeder apparatus, system and method.

2. Description of the Related Art

Ranchers typically feed their cattle, horses and other livestock fodder such as hay. Hay is typically transported, stored and provided to livestock in bales. Hay bales are tightly wrapped bundles, typically between five and six feet in diameter, weighing on average 1,000 pounds per bale. Hay feeders are conventionally used to feed the hay to livestock. Use of a hay feeder serves to keep the hay from being trampled, rotten or soiled, and reduces the amount of wasted hay.

Conventionally, cattle hay feeders consist of bars or pipe that are spaced at intervals and form an enclosure that surrounds, supports or holds a hay bale. The spaces between the bars allow a cow to stick his head through the bars in order to reach the hay. Since cattle need to stretch their heads through the bars of the feeder in order to reach for the hay, less hay is dropped outside the feeder, and less hay is wasted.

The following factors currently dictate the design of conventional hay feeders. First, the hay feeder is sized to hold a bale inside the feeder. The hay bale is typically cylindrical and either four feet thick and five feet in diameter, or six feet thick and six feet in diameter. Second, the feeder is sized to fit onboard a trailer so that it can be transported. The widest trailer that can currently be driven on a highway without a special permit is an eight-and-a-half foot wide trailer. Third, the rails of hay feeders are currently designed so that a cow must reach his head through the rails to reach the hay, in order to provide the "hay saving" feature of the hay feeder. Finally, most feeders are designed to feed sixteen to twenty cows at a time.

However, the inventor has observed that when a cow extends its head through the rails of a conventional hay feeder to reach for hay, the cow sometimes gets caught in the feeder. The cow becomes stuck in the feeder, and unless a rancher comes by, the cow is unable get anything to drink, struggles, gets twisted up, and eventually will die in such a predicament.

Another problem with conventional hay feeders is that in order to keep conventional hay feeders stocked with hay, ranchers often have to check and refill the hay feeders repeatedly to assure that the livestock have food available. This expends a considerable amount of the rancher's time that could otherwise be spent on other endeavors.

In addition to consuming hay, livestock must also consume minerals. Minerals and salt are a necessity for cattle. A conventional mineral box may hold mineral and/or salt blocks so the blocks can be consumed by livestock. Conventional mineral feeders are standalone apparatus of which livestock step on, crush, and spill the contents. Ranchers never know where conventional mineral boxes are going to be located when the ranchers attempt to check and refill the mineral boxes, since livestock push the conventional mineral boxes them all over the pasture.

Thus, for at least the reasons described above, there is a need for an improved bale feeder apparatus, system and method.

BRIEF SUMMARY OF THE INVENTION

A bale feeder apparatus, system and method is described. An illustrative embodiment of a bale feeder for feeding a herd of livestock includes at least three ring-shaped horizontal rails including a top rail, a bottom rail and a middle rail, the middle rail spaced above the bottom rail at a middle rail height measured from a ground, and a plurality of neck rails extending upwards and inwards from the middle rail to the top rail, each neck rail spaced apart from an adjacent neck rail on same side of the bale feeder at a neck rail distance, the middle rail height about equal to a length of a longest foreleg expected in the herd of livestock, and the neck rail distance falling within a range bounded by a widest head expected in the herd of livestock, and a narrowest adult shoulder width expected of any adult animal in the herd of livestock. In some embodiments, the bale feeder further includes a first corner neck rail extending upwards and inwards from the middle rail to the top rail on a first side of the bale feeder, a second corner neck rail extending upwards and inwards from the middle rail to the top rail on a second side of the bale feeder, the first corner neck rail and the second corner neck extending on opposing sides of a corner of the bale feeder, a connecting rail extending horizontally between the first corner neck rail and the second corner neck rail, and a distance between the first corner neck rail and the second corner neck rail below the connecting rail falling within the range bounded by the widest head and the narrowest adult shoulder width. In certain embodiments, the bale feeder further includes a mineral tray coupled to the middle rail between the first corner neck rail and the second corner neck rail. In some embodiments, spacing between neck rails on same side of the bale feeder are parallel to one another and each of the neck rail distances is constant therebetween. In certain embodiments, the middle rail height is about twenty five inches. In some embodiments, the longest foreleg, widest head and narrowest adult shoulder width expected in the herd of livestock are defined by a normal distribution of size data for animals of a type present in the herd of livestock, and the longest foreleg is two standard deviations above a mean foreleg length, the widest head is two standard deviations above a mean head width and the narrowest adult shoulder width is two standard deviations below a mean shoulder width in the normal distribution of size data. In certain embodiments, the longest foreleg, widest head and narrowest adult shoulder width expected in the herd of livestock are defined by a data table. In some embodiments, the longest foreleg, widest head and narrowest adult shoulder width expected in the herd of livestock are defined by actual measurement data taken from the herd of livestock. In certain embodiments, the neck rail distance is about 12.5 inches. In some embodiments, the widest head is about 9.05 inches and the narrowest adult shoulder width is about 13.38 inches. In certain embodiments, a distance between the top rail and the ground is about 50.40 inches. In some embodiments, the bale feeder further includes a rack on the bale feeder, the rack including a base resting on the top rail, and a rack top, the base substantially same size and shape as the top rail, the rack top substantially same size and shape as the bottom rail, and the rack and the bale feeder together forming an hourglass shape. In some embodiments, the bale feeder is a hay bale feeder and the livestock are cattle.

An illustrative embodiment of a method of determining rail spacing of a livestock bale feeder includes arranging at least three horizontal rings one above another, the at least three horizontal rings including a bottom ring, a middle ring and a top ring, wherein the middle ring is raised above the bottom ring and the top ring is raised above the middle ring, placing a plurality of neck rails extending inward and upward from the middle ring to the top ring, setting a height of the middle ring from ground about equal to a longest expected foreleg length of livestock to eat from the livestock bale feeder, and spacing a first neck rail of the plurality of neck rails a distance from an adjacent neck rail on same side of the livestock bale feeder, the distance falling within a range bounded by a widest expected head of livestock to eat from the livestock bale feeder, and a narrowest expected adult shoulder width of livestock to eat from the livestock bale feeder. In some embodiments, the height of the middle ring from ground is about 26.15 inches. In certain embodiments, the distance between adjacent neck rails on same side of the livestock bale feeder is about 12.87 inches. In certain embodiments, the method of determining rail spacing of a livestock bale feeder further includes calculating the longest expected foreleg length, widest expected head and narrowest expected adult shoulder width from a normal distribution of size data for livestock to eat from the livestock bale feeder, and the longest expected foreleg is two standard deviations above a mean foreleg length, the widest expected head is two standard deviations above a mean head width and the narrowest expected adult shoulder width is two standard deviations below a mean shoulder width in the normal distribution of size data. In some embodiments, the method of determining rail spacing of a livestock bale feeder further includes identifying the longest expected foreleg length, widest expected head and narrowest expected adult shoulder width from a table of data. In certain embodiments, the method of determining rail spacing of a livestock bale feeder further includes measuring livestock to eat from the livestock bale feeder to obtain the longest expected foreleg length, widest expected head and narrowest expected adult shoulder width. In some embodiments, the method of determining rail spacing of a livestock bale feeder further includes bounding a corner feeding space by two corner neck rails, the middle ring and a connecting rail, the connecting rail extending horizontally between the two corner neck rails, wherein an entirety of the corner feeding space falls within the range. In some embodiments, the method of determining rail spacing of a livestock bale feeder further includes integrating a mineral tray into the livestock bale feeder by attaching the mineral tray to an inside corner of the middle ring. In certain embodiments, the method of determining rail spacing of a livestock bale feeder further includes creating an hourglass shape to the livestock bale feeder by securing a rack on top of the top ring.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which:

FIG. 6 is a front elevation view of a bale feeder with rack of illustrative embodiments containing two bales of hay.

FIG. 7 is a perspective view of a plurality of livestock animals feeding from a bale feeder of illustrative embodiments.

Figure 1:
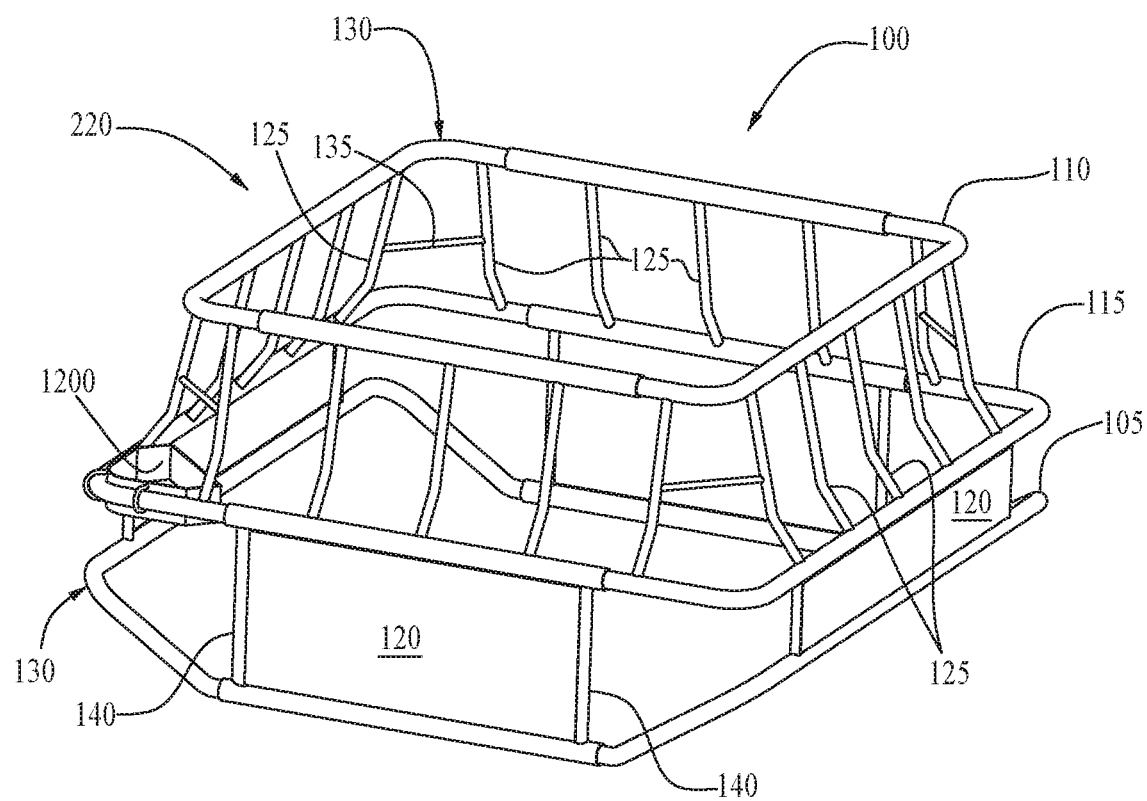
FIG. 1 is a perspective view of a bale feeder of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A bale feeder apparatus, system and method will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a rail includes one or more rails.

"Coupled" refers to either a direct connection or an indirect connection (e.g., at least one intervening connection) between one or more objects or components. The phrase "directly attached" means a direct connection between objects or components.

As used in this specification and the appended claims, "ring" or "ring-shaped" means a closed shape that surrounds a bale. As used herein, ring-shaped may be annular, circular, square, square with rounded corners, rectangular, rectangular with rounded corners, oval, or any other shape that encloses a bale 360° around.

As used in this specification and the appended claims, "about," with respect to a number, means within an inch of the stated number.

"Hay" refers to animal fodder of straw, herbage, shafted grains, grass-like plant stems, grass-like plant grains and/or other types of similar animal fodder.

As used in this specification and the appended claims, a "hay saving" bale feeder refers to a bale feeder of the type where, when feeding, an animal must slide its head between rails of the bale feeder in order to reach a bale inside the bale feeder.

Illustrative embodiments are primarily described herein in terms of a hay bale feeder for cattle, but the invention is not so limited. Illustrative embodiments are equally applicable to horses, goats, sheep or other livestock that may feed on hay or any other fodder provided in bales. Those of skill in the art will appreciate that the dimensions of the bale feeder of illustrative embodiments may be modified based on the expected size range of the type of animal being fed and the size of the food bale provided to the animals.

Illustrative embodiments of the invention described herein provide a bale feeder apparatus, system and method. In conventional "hay saver" bale feeder designs for cattle, cows become stuck in the feeder while reaching for hay, and may perish from lack of hydration and/or struggling to escape. After extensively researching the problem, the inventor has observed that there are two primary ways in which a cow may become stuck in a conventional hay feeder. The first is the cow's shoulders becoming stuck. While sticking his head between the rails of the feeder, a cow's shoulders also may pass through the rails, but once inside, the cow cannot remove his shoulders from the rails without rancher assistance. This results in the cow becoming stuck. The second is that the cow's forelegs become stuck. While reaching for hay, the cow steps over the lower bars of the conventional feeder, and then cannot step back. In either case, once the cow becomes stuck, the cow may perish due to dehydration or while twisting to escape.

Illustrative embodiments may reduce or eliminate instances of cows becoming stuck in a bale feeder by arranging rings and/or rails of the feeder so that the cow's shoulders and legs are unlikely to become stuck. Illustrative embodiments improve conventional hay bale feeders by spacing the feeder railings and rings based upon the expected dimensions of the animals using and/or intended to use the feeder, rather than solely based on the size of the bale or the size of trailer transporting the bale. At best, conventional hay feeder designs consider the width of a cow's head so the cow can "reach" for hay inside the railings, but ignore shoulder width and foreleg length. Illustrative embodiments dimension a bale feeder such that cattle or other livestock are unlikely to become stuck, either with their shoulders or their forelegs.

Illustrative embodiments may provide a hay rack seated atop a bale feeder of illustrative embodiments to increase the capacity of the hay feeder to two bales instead of one, while still maintaining the hay saving feature of the bale feeder. Illustrative embodiments may provide a mineral box integral to the hay feeder that may not be crushed, spilled or pushed around the pasture. Livestock may obtain their minerals at the same location the get their primary feed and ranchers may check and stock minerals at the same time and place as the bales.

To determine dimensions for a bale feeder of illustrative embodiments, the size of the animals using the bale feeder may be considered. Table 1 below illustrates exemplary sizes of the nine most popular American cattle breeds. The data in Table 1 has been ascertained after measuring hundreds of each type of adult animal to determine expected size ranges for each cattle breed.

TABLE 1

American Cattle Breed Size

| Breed | Live Weight (lbs.) | Height At Withers | Height At Rump | Length Of Body | Length of Rump | Width Of Shoulders (inches) | Width Of Haunch | Length Of Head | Width Of Head |
|---|---|---|---|---|---|---|---|---|---|
| Hungarian Simmental | 802-1503 | 48.42"-55.11" | 51.57"-57.08" | 48.81"-58.26" | 14.56"-21.25" | 13.77"-21.25" | 17.71"-22.83" | 18.50"-22.44" | 7.48"-9.05" |
| Hereford | 747-1477 | 47.63"-54.72" | 49.21"-54.72" | 52.81"-58.66" | 11.81"-19.68" | 14.56"-20.47" | 18.50"-24.01" | 17.32"-20.07" | 7.08"-8.66 |
| Aberdeen Angus | 976-1318 | 49.21"-53.93" | 48.81"-54.33" | 49.21"-58.26" | 14.56"-18.89" | 14.96"-20.86" | 19.68"-22.83" | 18.11"-20.47" | 7.08"-8.66" |
| Red Angus | 817-1701 | 48.42"-53.93" | 49.60"-57.08" | 48.03"-59.05" | 13.38"-20.07" | 15.74"-20.86" | 20.47"-25.19" | 17.71"-21.65" | 7.08"-9.05" |
| Lincoln Red | 1025-1406 | 50.39"-54.72" | 52.75"-54.72" | 53.14"-57.48" | 13.38:-19.29" | 16.14"-20.86" | 20.86"-23.62" | 20.07"-22.04" | 7.87"-8.66" |
| Limousin | 959-1530 | 53.14"-55.90" | 55.11"-59.05" | 51.96"-62.99" | 14.17"-23.62" | 18.89"-21.25" | 21.25"-24.40" | 18.11"-21.65" | 6.69"-8.26" |
| Charolais | 895-1604 | 51.18"-57.08" | 53.14"-57.87" | 51.57"-59.44" | 14.17"-20.86" | 13.38"-21.65" | 19.29"-22.44" | 18.50"-20.47" | 7.08"-8.66" |
| Blonde d'Aquitaine | 1036-1803 | 53.14"-55.90" | 52.75"-62.20" | 57.08"-62.99" | 14.96"-20.86" | 16.14"-25.19" | 16.92"-24.80" | 18.89"-22.04" | 6.29"-8.26" |
| Shaver | 1252-1538 | 53.14"-55.90" | 53.14"-56.29" | 53.14"-59.84" | 16.53"-19.68" | 18.50"-22.83" | 20.07"-24.01" | 19.24"-22.44" | 7.48"-9.05" |

Table 1 cattle dimensions may be used to ascertain the expected size of animals using the bale feeder of illustrative embodiments, when the animals are cattle. The shoulder width (width across both shoulders) and width of head may be measured at the widest location on the head and shoulders, respectively. Heights may be measured from the ground to the indicated location, such as the withers or rump. In the case of cattle, a cow may be considered adult-sized at two years of age or older. Expected size ranges may be determined from Table 1, from measurement data taken from a sampling of animals of the type that may feed from the bale feeder of illustrative embodiments and/or from actual measurement data taken from same animals that will feed from the bale feeder. In some embodiments, expected size ranges may be determined by first measuring and/or obtaining a set and/or normal distribution of size measurements from a group of animals of the type and breed that may feed from the bale feeder of illustrative embodiments. Once the measurement distribution is obtained, the mean of those measurements may be ascertained. The lower end of a measurement range, such as narrowest shoulder width, may be taken to be equal to two standard deviations below the mean, and the higher end of a measurement range, such as widest head or longest foreleg length, may be taken to be equal to two standard deviations above the mean.

In order to space the neck rails of a hay saving bale feeder of illustrative embodiments, the largest cattle head must fit through the rails, but the smallest shoulder width should not fit through the rails. In the example of Table 1, the largest expected head width is 9.05 inches, and the smallest expected shoulder width is 13.38 inches. Thus, the spacing between adjacent vertically extending neck rails of a bale feeder in this illustrative cattle example will be larger than 9.05 inches and smaller than 13.38 inches. This spacing represents a reduction in the spacing between neck rails as compared to conventional hay feeders, which typically space neck rails fifteen inches apart. As is apparent from the above Table 1, if neck rails are spaced fifteen inches apart, almost half the cattle breeds will have member cows that are able to fit their shoulders through the neck rails and become stuck. Illustrative embodiments represent an improvement over conventional bale feeders by reducing the distance between neck rails such that adult cattle with even the narrowest shoulders are unable to fit their shoulders between adjacent neck rails, thereby avoiding the shoulders becoming stuck.

Similarly, in Table 1 the tallest cow at the withers is 57.08 inches. A cows' foreleg length is about 45% of the cow's wither's height. Therefore, placing a horizontal rail barrier at the top of the tallest cow's front legs may prevent even the tallest cow from stepping over the piping and having a leg become stuck inside the feeder. Cows with shorter legs may have even more difficulty stepping in with a foreleg, since the railing is too high for them to step over. Calves are unlikely to duck underneath a railing based on observed animal behavior. Conventional hay feeders place a horizontal bar around the conventional hay feeders about fifteen inches from the ground, which is low enough for many cattle to step over while attempting to reach hay and having a leg become stuck as a result. Illustrative embodiments raise the horizontal barrier to about twenty-six inches, which is too high for even the tallest (longest forelegs) cattle to step over.

Figure 2:
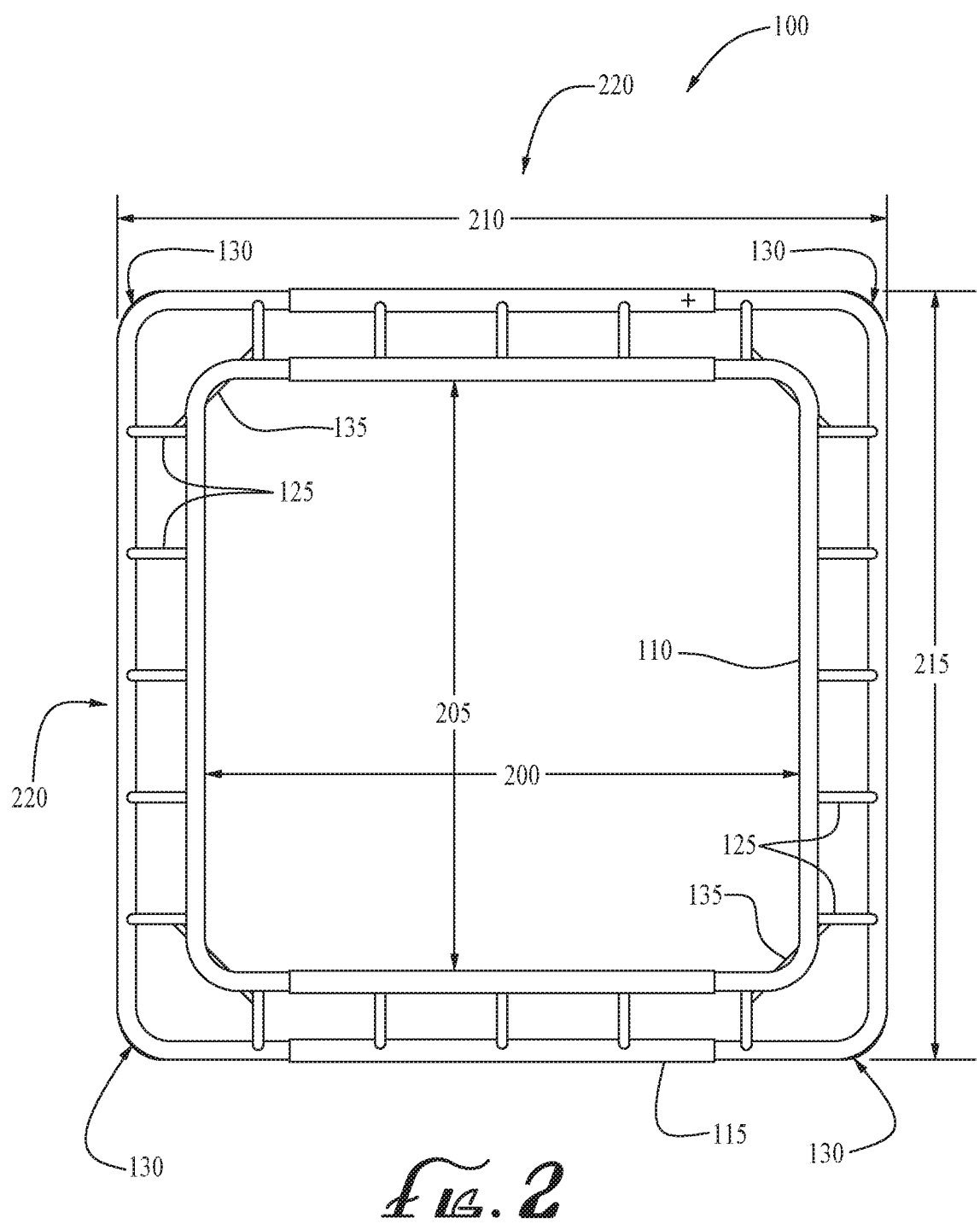
FIG. 2 is a top plan view of a bale feeder of an illustrative embodiment.

FIG. 1 illustrates an exemplary bale feeder of an illustrative embodiment. As shown, bale feeder 100 may be made of piping, bars, beams, panels and/or railing and may be steel and be between four-hundred pounds and five hundred pounds in weight. Feeders of such substantial weight may provide the advantage of being difficult to knock over by livestock, withstand weather, and may last a longer period of time than feeders with flimsier construction. Bale feeder 100 may be ring-shaped, such as about square-shaped or rectangular-shaped with rounded corners, as illustrated in FIG. 1. Bale feeder 100 may include three horizontal (substantially parallel to the plane of the ground), ring-shaped rails spaced at intervals one above and/or higher than another: bottom rail 105, middle rail 115 and top rail 110, respectively. Bottom rail 105 and middle rail 115 may be of about same diameter, perimeter and/or circumference such that middle rail 115 is positioned directly above bottom rail 105. On the other hand, top rail 110 may have a smaller diameter, perimeter and/or circumference than middle rail 115, such that top rail 110 is positioned above and inwards of middle rail 115. In an exemplary embodiment shown in FIG. 2, bale feeder 100 may have a top rail width 205 of 78.57 inches and a top rail length 200 of 79.04 inches for six foot diameter bales or similar, and bottom rail 105 may have bottom rail width 210 of 105.84 inches and bottom rail length 215 of 106.32 inches. In this exemplary embodiment, bottom rail length 215 and top rail length 200 are perpendicular to one another. Top rail 110 may be about 50.40 inches from ground and/or tall enough that livestock cannot reach over top rail 110 to reach a bale inside bale feeder 100. Other dimensions are possible based on the size of the bale, the size of the animals being fed, and the number of animals to feed concurrently, but top rail 110 should be inward of middle rail 115 to encourage livestock to reach inward for fodder by extending their heads between top rail 110 and middle rail 115 and also between neck rails 125 that extend inward and upward between top rail 110 and middle rail 115. These exemplary and non-limiting dimensions assume sixteen to twenty cattle feeding at one time, and a hay bale of between five feet and six feet in diameter.

Returning to FIG. 1, bottom rail 105 may serve as a base for bale feeder 100. Panels 120 may be steel sheets and/or steel panels and may support middle rail 115 and/or connect middle rail to bottom rail 105. In some embodiments, panels 120, where placed, may prevent livestock from stepping between bottom rail 105 and middle rail 115. In some embodiments, vertical pipes 140 may be used in addition to, or in place of panels 120 to separate and support middle rail 115 with respect to bottom rail 105. In the embodiment shown in FIG. 1, one panel 120 is on each of the four sides of bale feeder 100, and panels 120 are omitted from the corners of bale feeder 100. In some embodiments, panel 120 may extend circumferentially around bale feeder 100. In certain embodiments, only one, two or three sides of bale feeder 100 may employ one or more panels 120, or no panels 120 may be necessary. In further embodiments, no vertical pipes 140 may be necessary and only panels 120 may be employed between bottom rail 105 and middle rail 115. Bottom rail 105 may curve upwards at corners 130 such that bottom rail 105 rests on the ground at it sides, but is raised from the ground at corners 130. Raised corners 130 on bottom rail 105 may allow a bale bed or front loader to lift bale feeder 100 from underneath.

Figure 3:
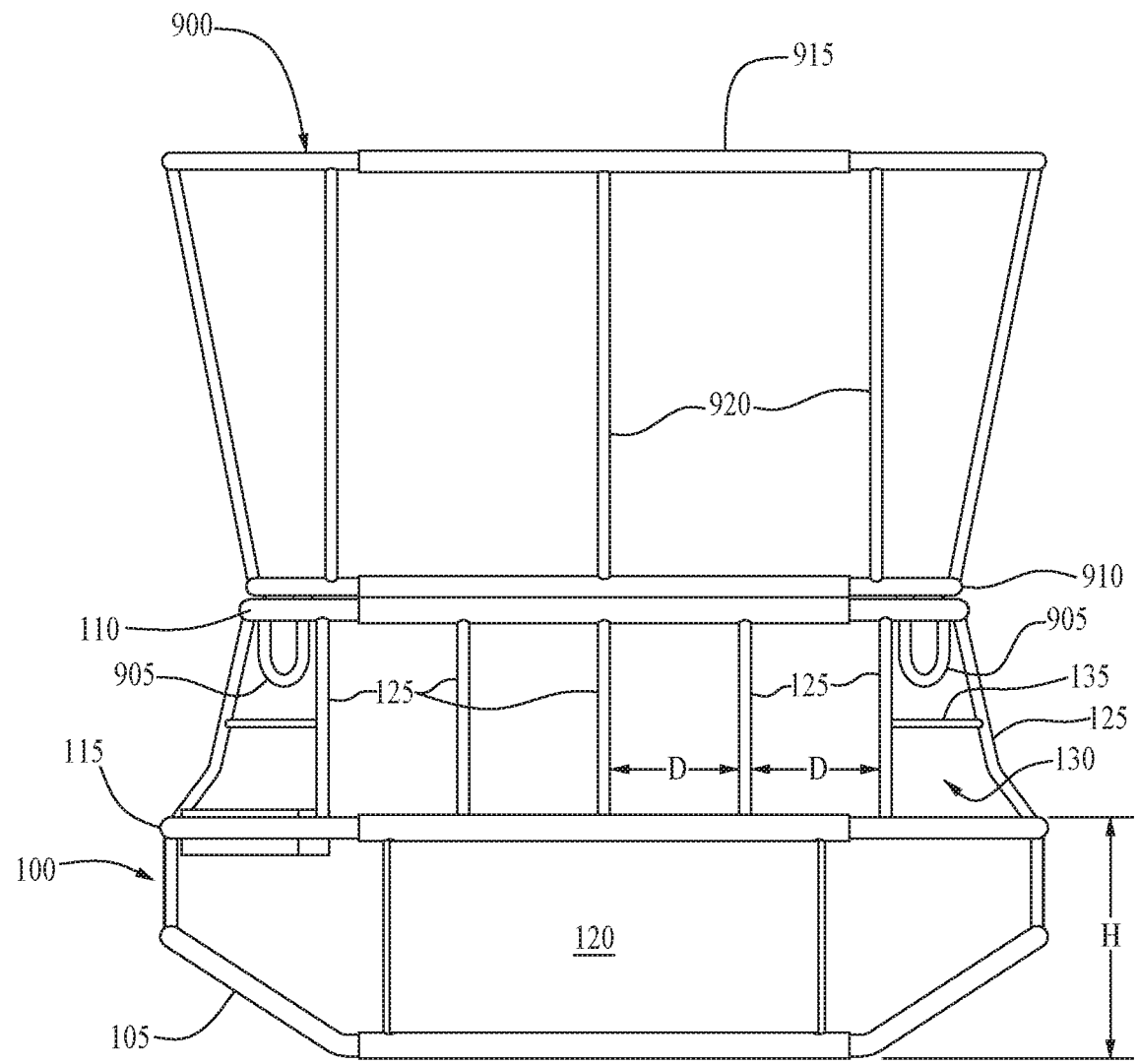
FIG. 3 is a front elevation view of a bale feeder with rack of an illustrative embodiment.

As shown in FIG. 3, middle rail 115 may be positioned above bottom rail 105 so as to extend around bale feeder 100 at a height H from the ground that matches the top, about the top, a little above the top and/or near the top, of the foreleg of the animal having the longest forelegs expected to feed from bale feeder 100. In one exemplary embodiment, middle rail 115 may have a height H of 26.15 inches from the ground. In the example of Table 1, the tallest cow at the withers is 57.08 inches, making this cow's foreleg height about 25.69 inches. Thus, placing middle rail 115 at a height H of about twenty-six inches may make the rail too high for any cattle expected to eat from bale feeder 100 to step over middle rail 115. A cow stepping over middle rail 115 of such height H would be equivalent to a human stepping over a bar as high as his hips, which as is well understood, is difficult to do without climbing or lifting your hip—an effort a cow is unlikely or unable to make, particularly inadvertently while eating. Top rail 110 may be about 24.25 inches above middle rail 115 and/or about 50.40 inches from ground. Top rail 110 may be placed high enough so that cattle cannot reach hay over top rail 110 of bale feeder 100. Top rail 110 may have a smaller circumference than middle rail 115 to allow neck rails 125 to slant and/or bend inwards away from feeding livestock.

Figure 4:
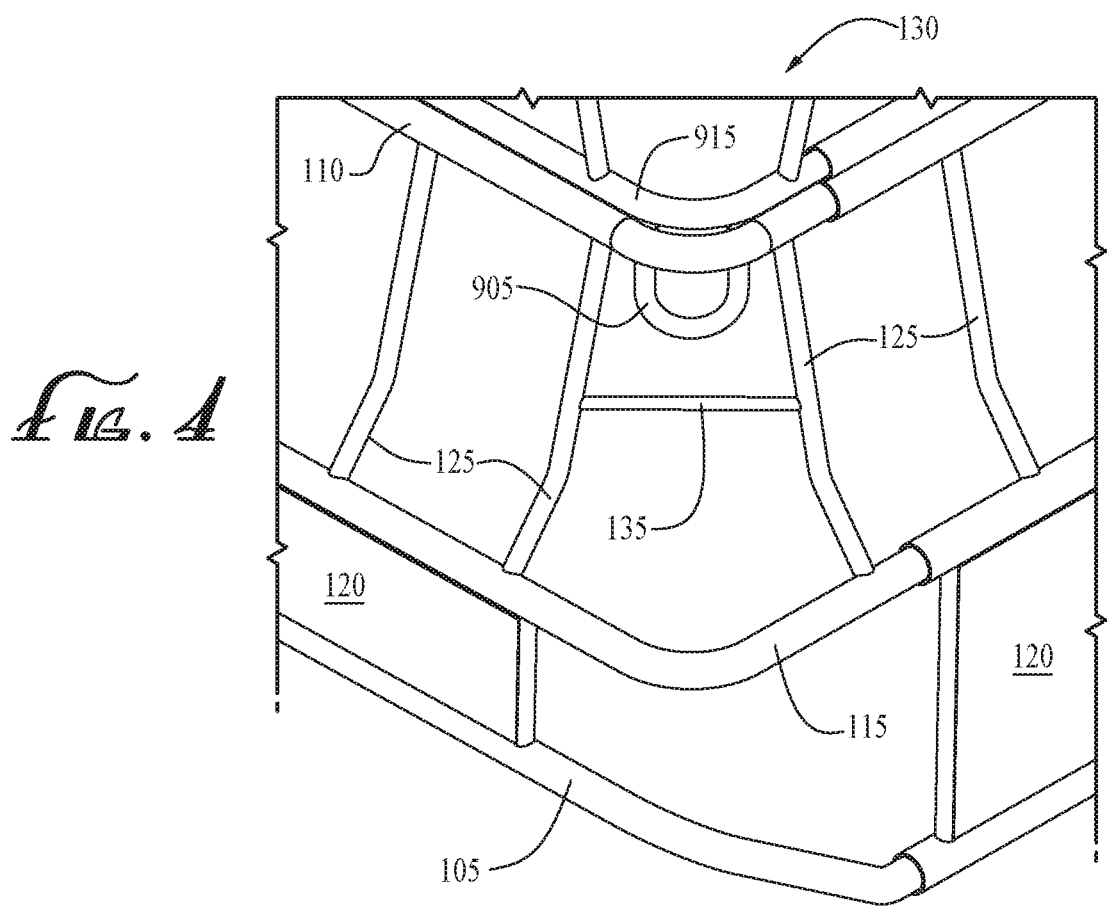
FIG. 4 is a perspective view of a bale feeder corner of an illustrative embodiment.

As shown in FIG. 1 and FIG. 4, neck rails 125 may extend upwards and inwards between middle rail 115 and top rail 110. Neck rails 125 may support and/or position top rail 110 above and inwards of middle rail 115. Neck rails 125 may be pipe, tubes, beams, rails or bars extending substantially vertically and/or perpendicularly to middle rail 115 and top rail 110. Neck rails 125 may be spaced at intervals around ring-shaped bale feeder 100. Livestock may reach their head between two adjacent neck rails 125 in order to reach the hay bale or other food placed inside bale feeder 100. As neck rails 125 extend upward, neck rails 125 may bend, curve and/or or slant inwards towards a hay bale, in order to induce animals to reach away from their legs while reaching for fodder inside bale feeder 100.

A neck rail 125 may be spaced at an interval of distance D from an adjacent neck rail 125 around bale feeder 100. Neck rails 125 may or may not be parallel to one another and the intervals of distance D may be even or uneven. In the example shown in FIG. 1 and FIG. 3, along each side 220 of bale feeder 100, neck rails 125 are parallel to one another and adjacent neck rails 125 are spaced at an even, constant distance D apart from one another on same side 220 of bale feeder 100. In one exemplary embodiments, distance D between adjacent neck rails 125 on same side 220 is 12.87 inches. Conventional neck rails are spaced about fifteen inches apart, which may undesirably allow cattle to slide their shoulders into a conventional bale feeder and become stuck at the shoulders. In illustrative embodiments, placing neck rails 125 a distance D apart that is wide enough for the largest expected cattle head to reach in, but small enough that the narrowest adult shoulders cannot fit through, represents an improvement over conventional hay feeders and provides the advantage that cattle may not become stuck at the shoulders when reaching into bale feeder 100. In the example of Table 1, adjacent neck rails 125 should be spaced a distance D at least 9.05 inches apart, but no greater than 13.38 inches apart. Spacing intervals for neck rails 125 may be even or uneven, but always be between the aforementioned range, with the exception of corners 130 as more specifically described herein.

Figure 5:
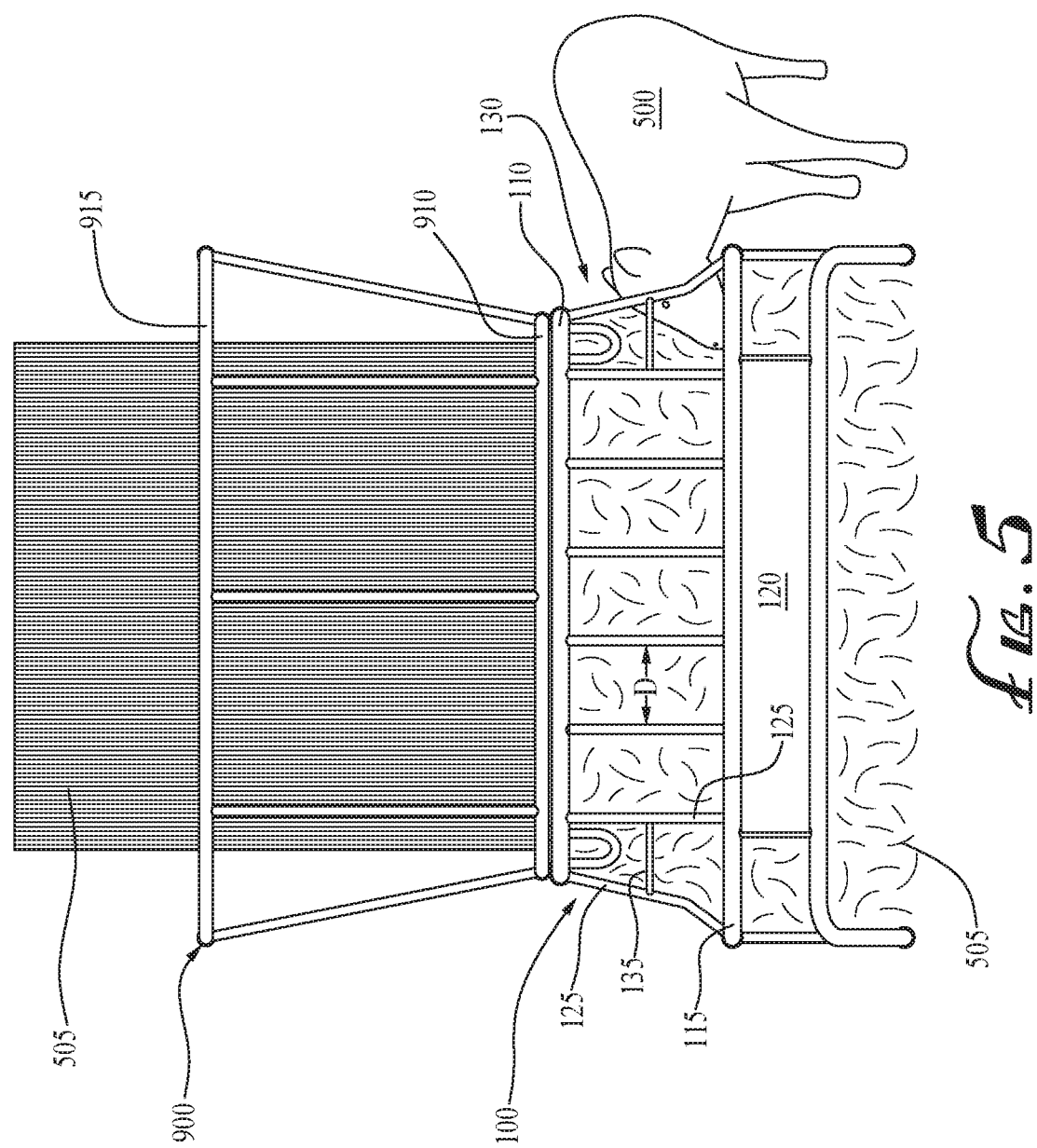
FIG. 5 is a side elevation view of a bale feeder of an illustrative embodiment with a cow feeding from a corner.

In some embodiments, ring-shaped bale feeder 100 may include corners 130, such as in rounded square embodiments or rounded rectangle embodiments. At corners 130, neck rails 125 may not be parallel to accommodate the curve of corner 130, but corners 130 still may be used for feeding. By making corners 130 accessible, four additional heads may feed from bale feeder 100 concurrently. FIG. 4 illustrates a corner 130 of an illustrative embodiment. As shown in FIG. 4, adjacent rails 125 spanning corner 130 maybe further apart at middle rail 115 than at top rail 110, such that the distance D between corner 130 neck rails decreases moving towards top rail 110. Horizontal connecting bar 135 may span the space of corner 130 between adjacent neck rails 125 at a position where the distance D above horizontal connecting bar 135 becomes a size where the space is smaller than the largest head width of the animals expected to eat and/or eating from bale feeder 100. Thus, in the aforementioned example where distance D is at least 9.05 inches (width of widest expected head) and no greater than 13.38 inches (width of narrowest expected adult shoulders), horizontal connecting bar 135 may be placed at a location where distance D is 9.05 inches between adjacent rails 125 spanning a corner 130. Underneath horizontal connecting bar 135, space between neck rails 125 at corners 130 may be within the range that is greater than the widest head width and smaller than the narrowest shoulder width as described herein. Connecting bar 135 may be horizontal, substantially horizontal and/or parallel to the ground. The distance D between adjacent neck rails 125 spanning corner 130 at middle rail 115 should not be wider than the narrowest shoulder width expected to feed from bale feeder 100. In the example of Table 1, the distance D at corner 130 between adjacent rails 125 is not wider than 13.38 inches. Connecting bar 135 may prevent an animal's head from becoming stuck in the narrow top of the space between adjacent neck rails 125 at corners 130. Connecting bar 135 may prevent an animal from becoming stuck in any corner 130 area where the spacing between neck rails 125 is outside of the safe neck rail 125 boundaries of illustrative embodiments, which may be bounded by the widest expected animal head and the narrowest expected adult shoulder width to feed from bale feeder 100. FIG. 5 illustrates a cow 500 eating hay from bale 505 at corner 130 slot. As FIG. 5 illustrates, when feeding at corner 130, cow 500 must slide his head over middle rail 115, under connecting bar 135 and between adjacent neck rails 125. This head space may be wide enough for the head of cow 500 to fit through, but too narrow for his shoulders.

FIGS. 5-7 illustrate a bale feeder of an illustrative embodiment employed as a cattle hay feeder. FIG. 6 illustrates an exemplary relationship between height H of middle rail 115 and cow 500. In FIG. 6, middle rail 115 is located at height H proximate to the top of foreleg 510 of cow 500. In FIG. 7 several cows 500 are shown concurrently eating from bale feeder 100. Each cow 500 head extends through neck rails 125, but each cow 500 shoulders do not fit through the space between neck rails 125.

Those of skill in the art will appreciate that the dimensions of bale feeder 100 may be adjusted based upon the type and size of animal using bale feeder 100 and the size of bale employed. Normal size distribution, average and/or expected size ranges of the most popular breed of livestock species and/or specified breeds of livestock species may be considered in dimensioning the hay feeder of illustrative embodiments. Illustrative embodiments position a circumferential railing at a height of the tallest expected foreleg 510, and also space neck adjacent railings 125 a distance D in a range that is wider than the widest expected head, but narrower than the narrowest expected shoulders width. In certain embodiments, specific animals, such as specific cows 500, may be measured and a custom-fit bale feeder 100 may be employed. In some embodiments, a normal/Gaussian size distribution may be obtained and standard deviations may be employed to determine the top and bottom of an expected size range for head width and shoulder width. The features of illustrative embodiments may improve livestock feeders by reducing instances of animals becoming stuck and perishing in a hay feeder by reducing the likelihood that an animal's legs or shoulders become stuck while reaching for food.

Figure 8A:
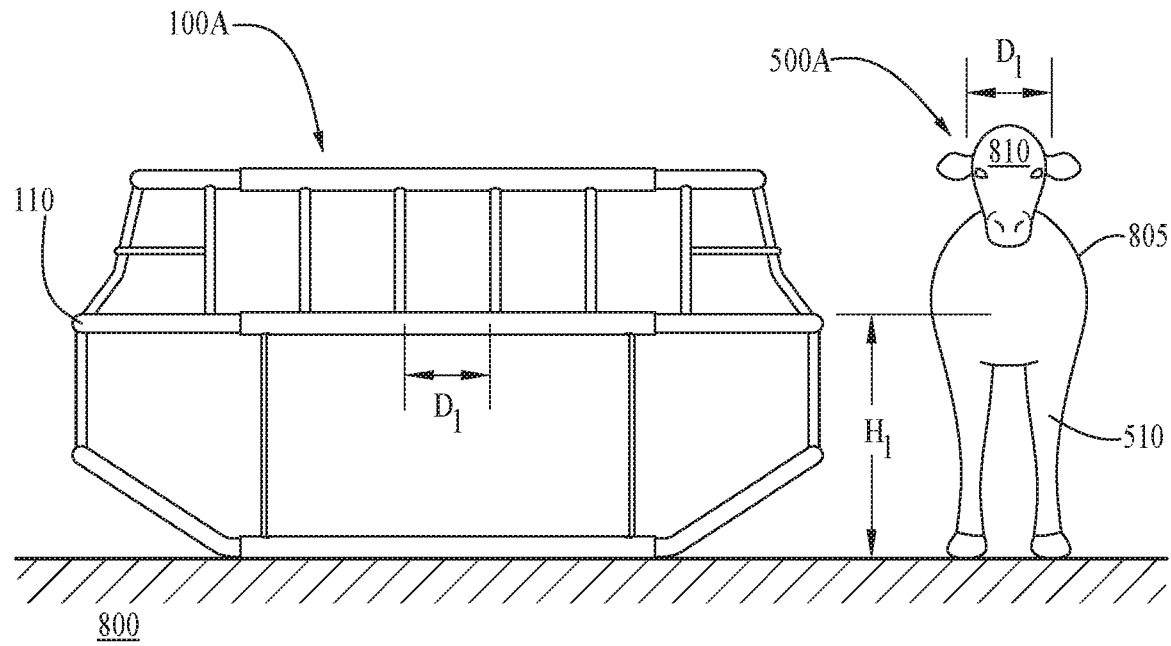
FIGS. 8A-8C are schematics demonstrating railing dimensions of a bale feeder of illustrative embodiments.
Figure 8B:
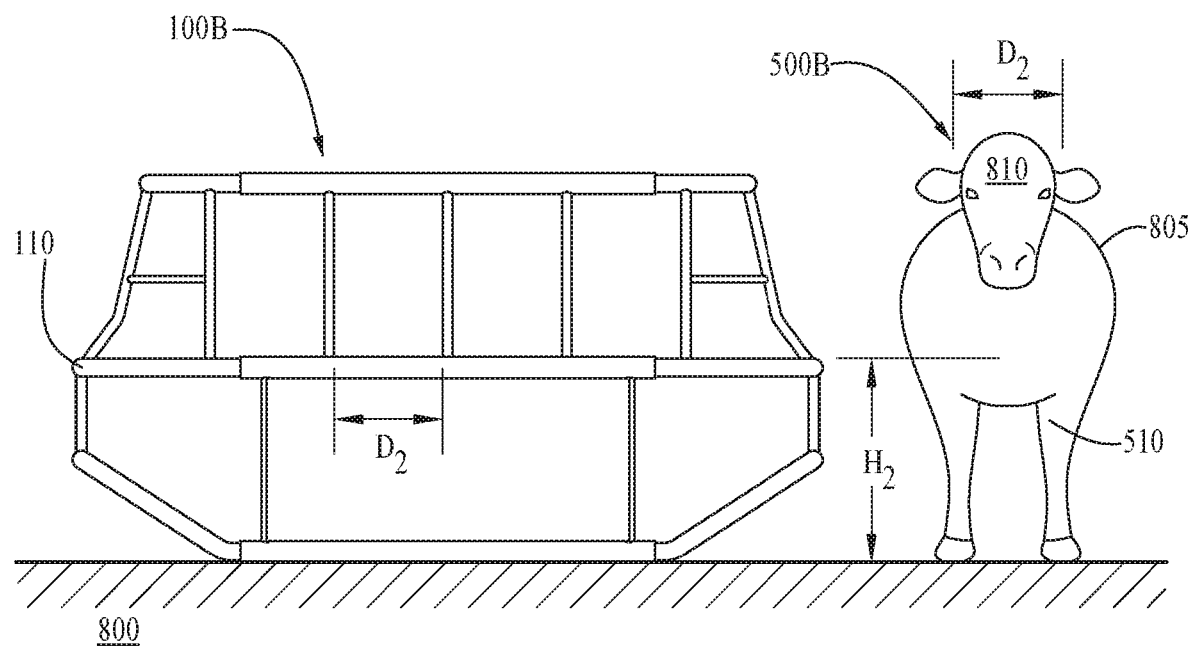
Figure 8C:
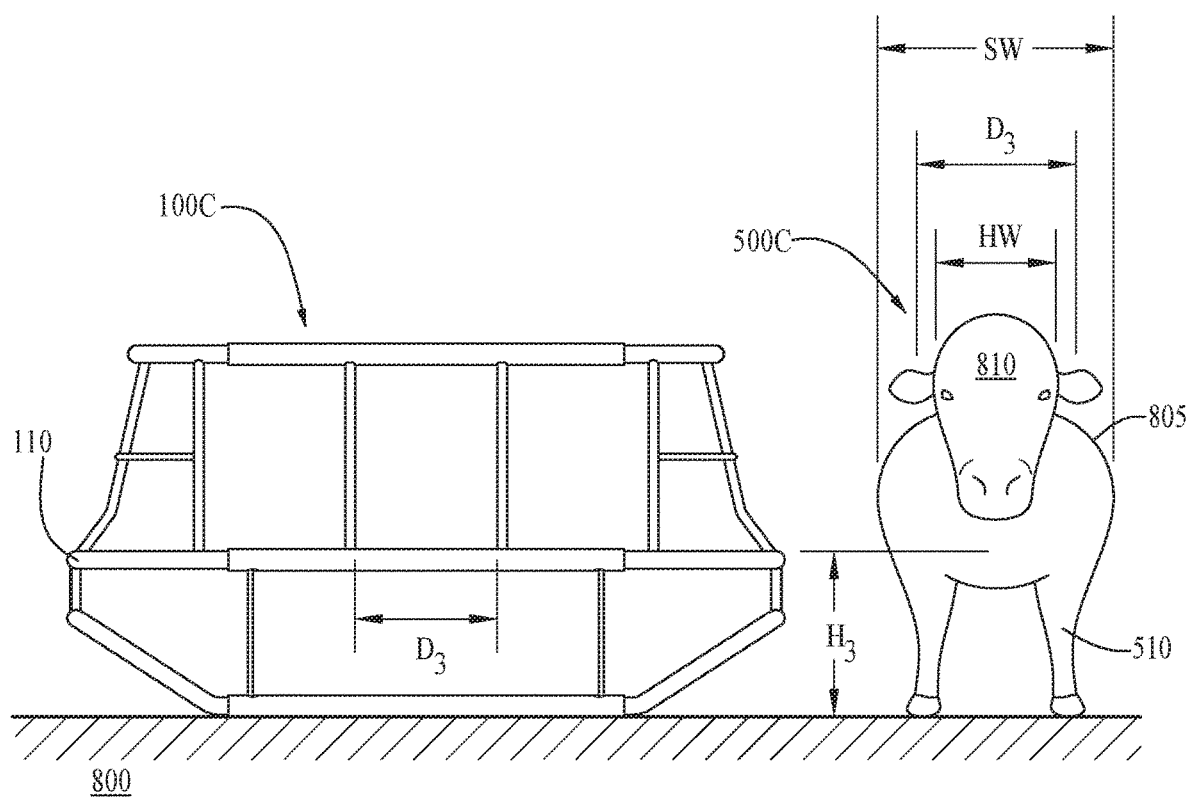

FIGS. 8A-8C illustrate adjustment of distance D between adjacent neck rails 125, and height H of middle rail 115 from ground based on the size of animal feeding from bale feeder 100. Height H of middle rail 115 from ground 800 may be raised as the length of the tallest foreleg 510 of the animals expected to use, or identified as using, bale feeder 100 increases. Similarly, the distance D between adjacent neck rails 125 may increase as narrowest adult animal shoulders 805 become wider and/or as widest head width HW approaches narrowest adult shoulder width SW. For example, cow 500A of FIG. 8A is taller than cow 500B of FIG. 8B and cow 500C of FIG. 8C, where cow 500A, 500B and 500C represent the animals with the longest foreleg 510 length expected to use or actually using bale feeder 100A, 100B and 100C respectively. Height $H_1$ of middle rail 110 of bale feeder 100A is therefore higher than height H2 of middle rail 110 of bale feeder 100B, and also higher than $H_3$ of middle rail 110 of bale feeder 100C. Distances $D_1$, $D_2$ and $D_3$ may be set within the range that is wider than the widest head width HW and narrower than the narrowest shoulder width SW of the animals expected to feed from, or actually feeding from bale feeder 100. Those of skill in the art may appreciate that the animal expected to have the widest head width HW may be a distinct animal, type and/or breed from the animal expected to have the narrowest adult shoulder width SW. As perhaps best shown in FIG. 8C, distance $D_3$ is wider than head width HW, but narrower than shoulder width SW, where animal 500C represents the animal and/or animals with the widest head 810, narrowest adult shoulder 805 width across both shoulders 805, and longest foreleg 510 that is expected to use bale feeder 100C.

Figure 9:
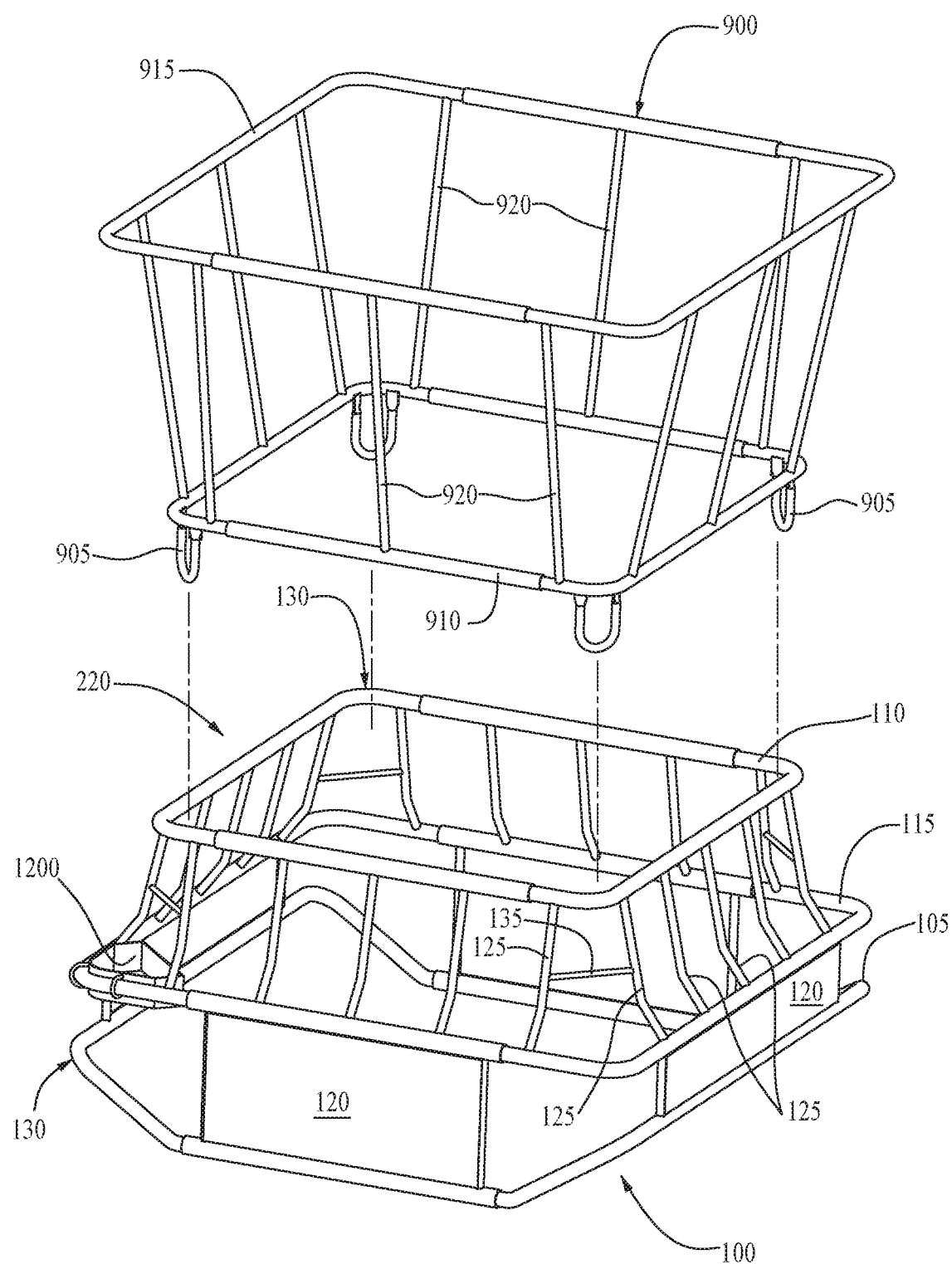
FIG. 9 is a perspective view of an exemplary rack being placed on a bale feeder of illustrative embodiments.

Bale feeder 100 may include feeder rack 900 seated atop bale feeder 100 to increase the capacity of bale feeder 100 in order to keep livestock fed for longer, as compared to a feeder without feeder rack 900. FIG. 9 illustrates an exemplary feeder rack 900. Bale feeder 100 with feeder rack 900 may hold two bales 505, one atop the other, rather than one bale 505. Feeder rack 900 maybe tall enough to retain a second bale 505, but low enough to load feeder rack 900 with a front end load tractor. Clips 905 may hold feeder rack 900 onto bale feeder 100. Together bale feeder 100 and feeder rack 900 may be hourglass shaped. Bales 505 may drop down as cows 500 and/or other livestock eat from the bottom half and/or bottom portion of the bale feeder 100 and feeder rack 900 combination. Illustrative embodiments may provide an improved bale feeder 100 system that saves hay, holds more hay and fits the shape of the bales 505.

Figure 10:
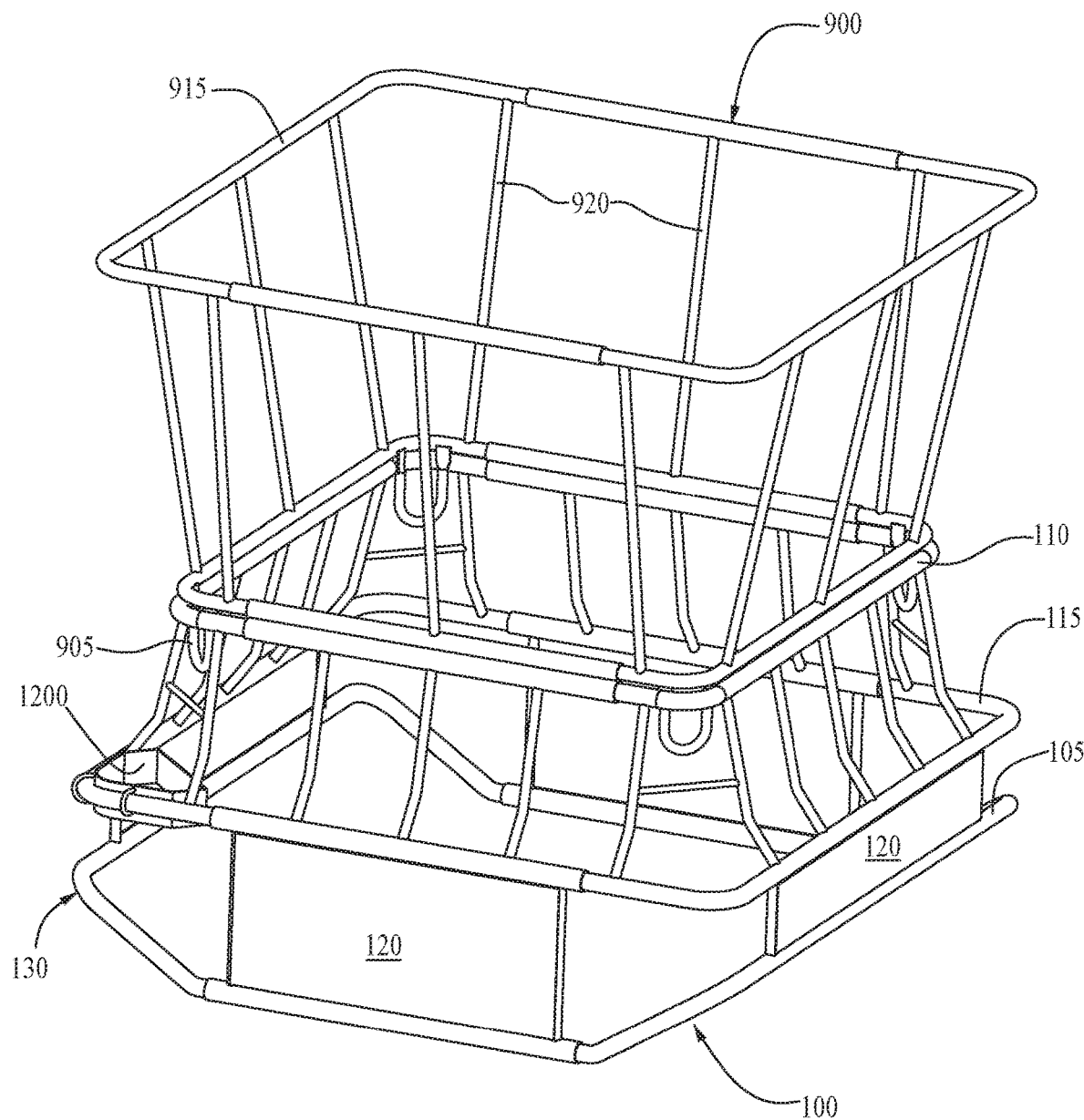
FIG. 10 is a perspective view of a hay feeder and rack combination of illustrative embodiments.

As shown in FIGS. 9-10, feeder rack 900 fits atop bale feeder 100 and sits upon, secures and/or attaches to top rail 110. Clips 905 may be clasps, hooks, locks, ties and/or any fastener that holds rack 900 in place on bale feeder 100. Clips 905 may be positioned at corners 130, a location where connecting bar 135 may prevent heads 810 from bumping into and/or un-securing clips 905. In some embodiments, the weight of rack 900 may sufficiently hold rack 900 in place, and no fastening mechanism and/or clips 905 may be necessary. Similarly to bale feeder 100, feeder rack 900 may be made of steel pipes, bars, rails and/or tubing. Rack 900 may include rack base 910, which rests, attaches, secures and/or clips on to top rail 110 of bale feeder 100, and rack top 915. Top rail 110 of bale feeder 100 and rack base 910 may be the same size and shape or about the same size and shape to one another such that when rack 900 is placed on bale feeder 100 the two mate, match and/or line up together. Rack top 915 of rack 900 may be the same size and shape or about the same size and shape to bottom rail 105 of bale feeder 100, such that rack 900 and bale feeder 100 together form an hourglass-type shape that is symmetric and/or well-balanced. The top and bottom of rack 900 and bale feeder 100 combination may be wider than the waistline where top rail 110 and rack base 910 meet. The circumference, diameter and/or perimeter of rack top 915 may be larger than that of rack base 910.

Figure 11:
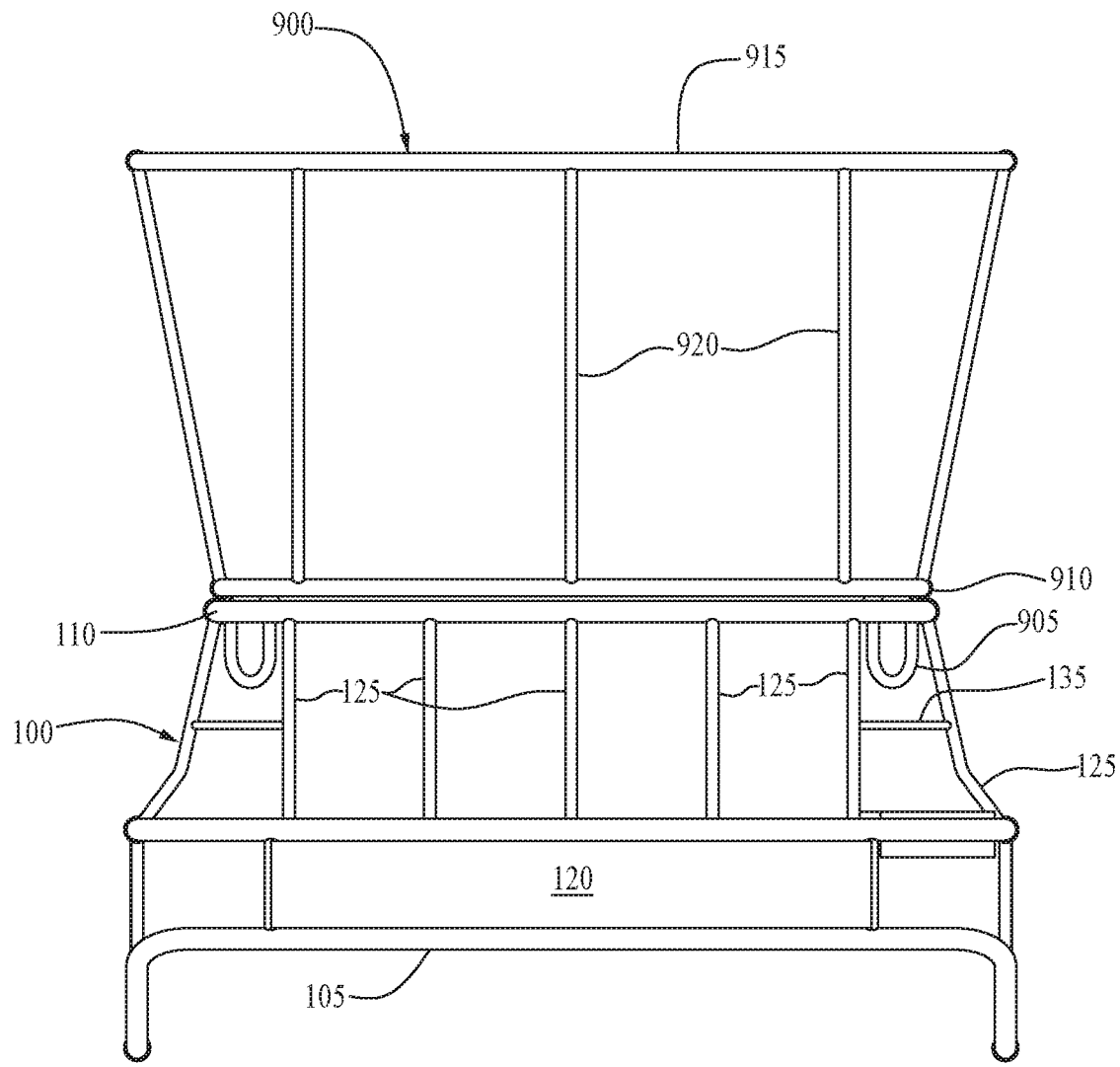
FIG. 11 is a side elevation view of a bale feeder with rack of an illustrative embodiment.

Rack rails 920 may connect rack base 910 to rack top 915 and extend between them. Rack rails 920 may extend upwards and outwards between rack base 910 and rack top 915. While bale feeder 100 becomes smaller in diameter towards the top of bale feeder 100, rack 900 may become larger in diameter towards rack top 915, creating the hourglass or cinched-waist shape. FIG. 11 illustrates the hourglass profile of bale feeder 100 with attached rack 900. Rack 900, when employed atop bale feeder 100, may double the bale 505 capacity of a bale feeder system whilst still matching the shape of bales 505 and keeping bales 505 out of reach of livestock such as cows 500, except through designated feeding spaces, such as the space bounded by adjacent neck rails 125, middle rail 115 and top rail 110 of bale feeder 100. As livestock consumes hay through spaces between rails 125, hay may drop down to continue to feed the livestock. As bottom bale 505 is depleted, top bale 505 drops down. Once it has dropped, hay may be accessed by livestock through same spaces, which may keep livestock fed for a longer duration, about twice as long as without rack 900, without the need for a rancher to re-stock bale feeder 100.

Figure 12:
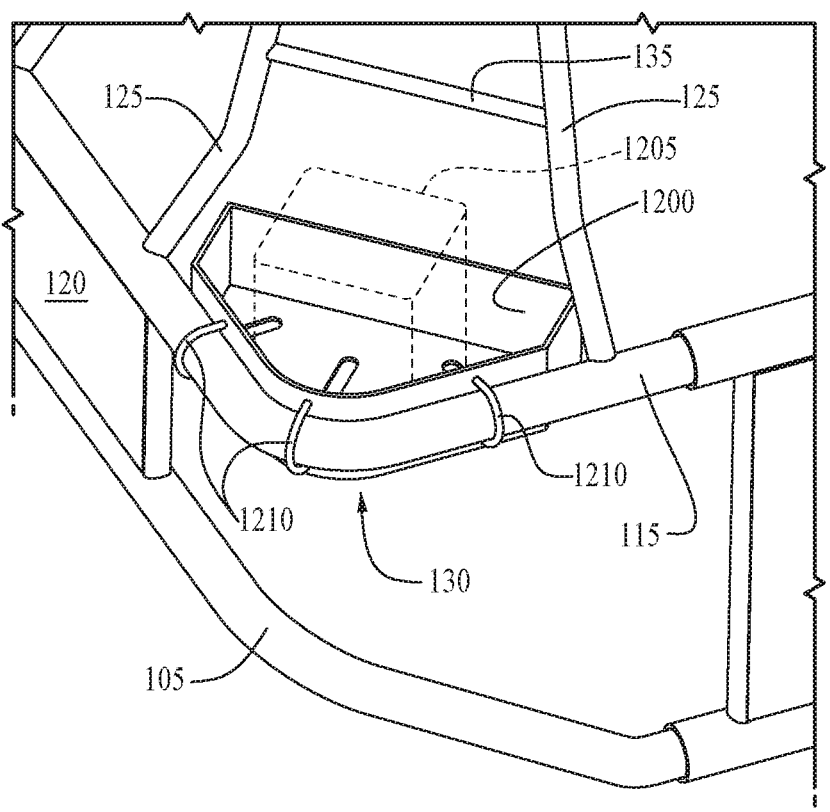
FIG. 12 is a perspective view of a bale feeder with integral mineral tray of an illustrative embodiment.

Illustrative embodiments of bale feeder 100 may include a mineral tray integral to bale feeder 100. As shown in FIG. 12, mineral tray 1200 is integral to bale feeder 100 and may not be stepped on, crushed, spilled or pushed around the pasture. Mineral tray 1200 may be attached to middle rail 115, which middle rail 115 is placed at height H, a height too high for foreleg 510 to reach over or step on. In addition, with mineral tray 1200, livestock may obtain their minerals 1205 at the same location the get their primary feed (hay), namely bale feeder 100. In addition, placement of mineral tray 1200 is more efficient to check and refill since as a rancher fills bale feeder 100 with bales 505, mineral 1205 supply can also be checked with a glance and refilled at the same location. Mineral tray 1200 may be secured into corner 130 of bale feeder 100 and attached to middle rail 115. Mineral tray 1200 may curve to follow the shape of corner 130 formed by middle rail 115 and/or mate with the inside corner 130 of middle rail 115. Fasteners 1210 may secure middle rail 115 to mineral tray 1200. Fasteners 1210 may be wires, ties, clasps, hooks, locks and/or any fastener that holds mineral tray 1200 in place that may not be easily dislodged by livestock.

Thus, the invention described herein provides one or more embodiments of a bale feeder apparatus, system and method. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. An improved bale feeder for feeding a herd of livestock of at least one breed, the improved bale feeder comprising:
   at least three ring-shaped horizontal rails comprising a top rail, a bottom rail and a middle rail;
   the middle rail spaced above the bottom rail at a middle rail height measured from a ground; and
   a plurality of neck rails extending upwards and inwards from the middle rail to the top rail, each neck rail spaced apart from an adjacent neck rail on same side of the bale feeder at a neck rail distance;
   the middle rail height about equal to a length of a longest foreleg standard for the at least one breed in the herd of livestock; and
   the neck rail distance comprising a range bounded by:
      a widest adult head in the herd of livestock standard for the at least one breed; and
      a narrowest adult shoulder width the herd of livestock standard for the at least one breed;
   a first corner neck rail extending upwards and inwards from the middle rail to the top rail on a first side of the bale feeder;
   a second corner neck rail extending upwards and inwards from the middle rail to the top rail on a second side of the bale feeder;
   the first corner neck rail and the second corner neck rail extending on opposing sides of a corner of the bale feeder;
   a connecting rail extending horizontally between the first corner neck rail and the second corner neck rail; and
   a distance between the first corner neck rail and the second corner neck rail below the connecting rail falling within the range bounded by the widest adult head and the narrowest adult shoulder width of the at least one breed in the herd of livestock; and
   wherein the improved bale feeder so dimensioned mitigates the livestock from getting trapped in the improved bale feeder.

2. The bale feeder of claim 1, further comprising a mineral tray coupled to the middle rail between the first corner neck rail and the second corner neck rail.

3. The improved bale feeder of claim 1, wherein spacing between neck rails on same side of the bale feeder are parallel to one another and each of the neck rail distances is constant therebetween.

4. The improved bale feeder of claim 1, wherein the middle rail height is about twenty-five inches.

5. The improved bale feeder of claim 1, wherein the longest foreleg, widest adult head and narrowest adult shoulder width in the herd of livestock standard for the at least one breed are defined by a normal distribution of size data for the at least one breed, and the longest foreleg is two standard deviations above a mean foreleg length, the widest adult head is two standard deviations above a mean head width and the narrowest adult shoulder width is two standard deviations below a mean shoulder width in the normal distribution of size data.

6. The improved bale feeder of claim 1, wherein the longest foreleg, widest adult head and narrowest adult shoulder width standard for the at least one breed in the herd of livestock are defined by a data table.

7. The improved bale feeder of claim 1, wherein the longest foreleg, widest adult head and narrowest adult shoulder width of the at least one breed in the herd of livestock are defined by actual measurement data taken from the at least one breed.

8. The improved bale feeder of claim 1, wherein the neck rail distance is about 12.5 inches.

9. The improved bale feeder of claim 1, wherein the widest adult head is about 9.05 inches and the narrowest adult shoulder width is about 13.38 inches.

10. The improved bale feeder of claim 1, wherein a distance between the top rail and the ground is about 50.40 inches.

11. The improved bale feeder of claim 1, further comprising:
    a rack on the bale feeder, the rack comprising a base resting on the top rail, and a rack top;
    the base substantially same size and shape as the top rail;
    the rack top substantially same size and shape as the bottom rail; and
    the rack and the bale feeder together forming an hourglass shape.

12. The improved bale feeder of claim 1, wherein the bale feeder is a hay bale feeder and the livestock are cattle.

* * * * *